United States Patent [19]

Levis

[11] 4,178,100

[45] Dec. 11, 1979

[54] DISTRIBUTED-SWITCH DICKE RADIOMETERS

[76] Inventor: Robert A. Frosch, Administrator of the National Aeronautics and Space Administration with respect to an invention of Curt A. Levis, Columbus, Ohio

[21] Appl. No.: 891,356

[22] Filed: Mar. 29, 1978

[51] Int. Cl.² .......................... G01J 1/56; H04B 17/00
[52] U.S. Cl. .................................... 356/216; 325/363; 343/100 ME; 73/355 R
[58] Field of Search ................ 356/222, 216; 325/363, 325/367; 343/100 ME; 73/355 R

[56] References Cited

U.S. PATENT DOCUMENTS

| | | | |
|---|---|---|---|
| 3,466,654 | 9/1969 | Abronson | 343/100 ME |
| 3,631,346 | 12/1971 | Riggs | 325/363 |
| 3,777,720 | 12/1973 | Hardy et al. | 325/363 |
| 3,876,947 | 4/1975 | Giraudon | 325/367 |

*Primary Examiner*—Rolf G. Hille

*Attorney, Agent, or Firm*—Ronald F. Sandler; John R. Manning; John O. Tresansky

[57] ABSTRACT

A radiometer on an orbiting spacecraft derives high spatial resolution information from terrestrial and atmospheric regions. N elements or subapertures on the spacecraft transduce electromagnetic energy into electric signals. Many or all of the elements are simultaneously illuminated by electromagnetic energy radiated from the same region. Identical, parallel processing channels are responsive to the N elements. Each of the channels includes a variable gain amplifier responsive to the signal transduced by its corresponding array elements. The gain of each amplifier is controlled as a function of the output difference when the channel is connected periodically to each of a pair of Dicke noise sources, such as resistors maintained at predetermined temperatures. Output signals from the different channels, indicative of radiation from subregions of the terrestrial region, are combined phase-coherently to derive a further signal that is a replica of the radiant energy from the subregion and indicative of the vector sum of the energy illuminating all of the elements of the array.

26 Claims, 2 Drawing Figures

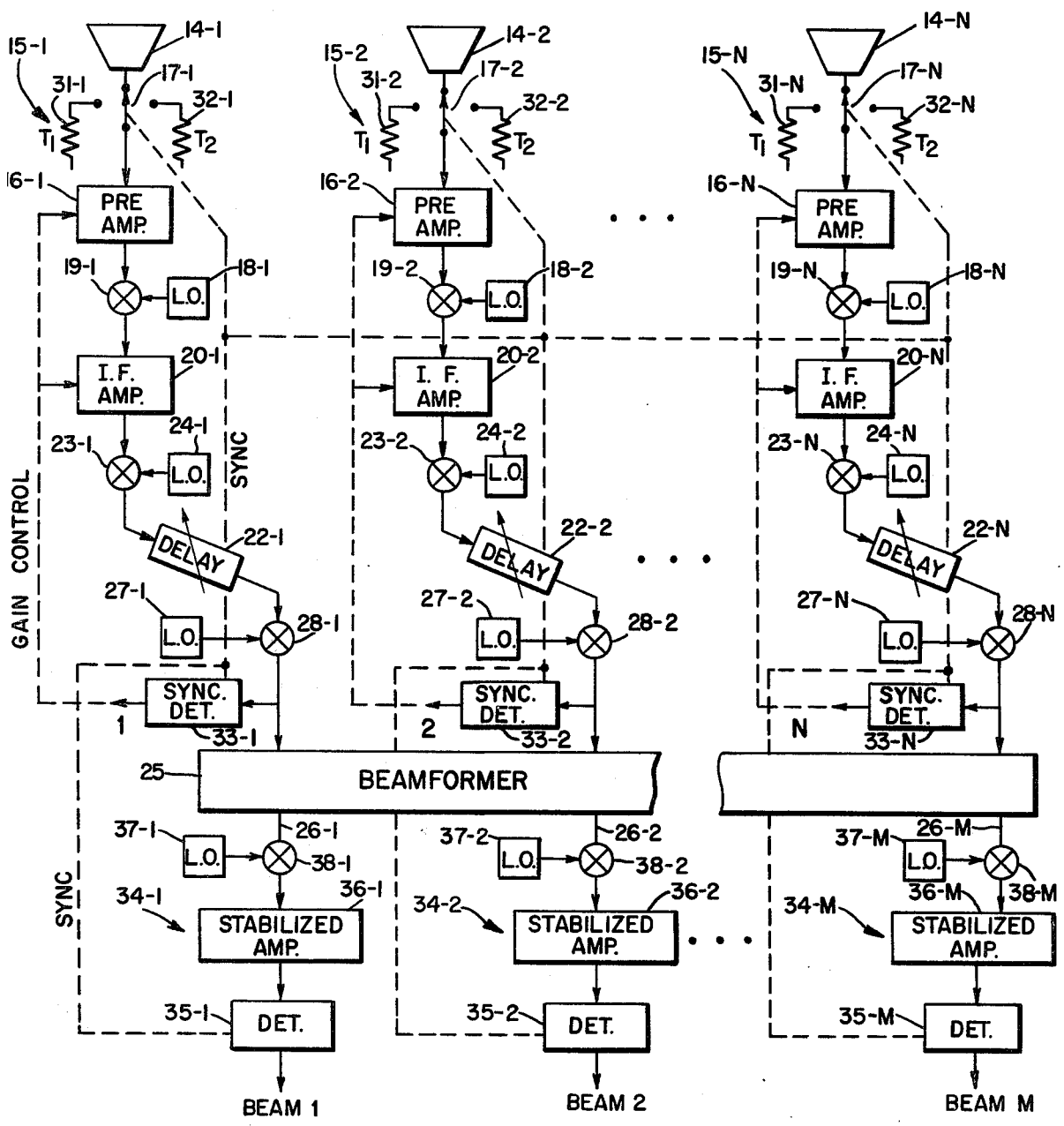

DISTRIBUTED-SWITCH DICKE RADIOMETERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457), and may be manufactured and used by or for the Government for governmental purposes without the payment of any royalties thereon or therefor.

BACKGROUND OF THE INVENTION

The present invention relates generally to radiometers and more particularly, to an aircraft or orbiting spacecraft radiometer including an array of electromagnetic energy-to-electric signal transducers that are simultaneously responsive to energy from a terrestrial or atmospheric region, which signals are combined phase-coherently to attain high resolution information or images of the region.

Orbiting spacecraft have been employed as platforms for deriving terrestrial and atmospheric geophysical parameters in response to microwave and millimeter wave energy derived from terrestrial and/or atmospheric regions. An electromagnetic wave-to-electric signal transducer, in the form of an antenna or an optical energy detector, derives a replica of the radiant energy given off by the terrestrial region; the replica usually has noise-like properties.

Important properties of such radiometers are the spatial and temperature resolutions. The spatial resolution of a radiometer is the precision with which the radiometer can distinguish signals arising from adjacent locations, and is dependent directly on the transducer size so that large transducers (antennae) are required for high spatial resolution. Temperature resolution, i.e., sensitivity, is the precision with which a radiometer can distinguish incident radiation intensity levels. For certain applications, it is desirable to attain very great spatial resolution, as well as a high temperature resolution.

In the prior art, spatial resolutions on the order of 1 degree of arc in each plane have been attained by utilizing transducers including relatively large parabolic reflectors or arrays. Theoretically, higher spatial resolution can be obtained by increasing the parabolic reflector diameter; however, increasing the diameter of the reflector causes several problems. In particular, there is a loss of temperature resolution with increased reflector diameter due to the reduced dwell time per resolution cell. When an array is used, there is an additional sensitivity loss due to lower efficiency and narrower band width of the large array. A wide band width radiometer is important because of the wide band width, noise-like properties of the radiation emanating from the region of interest. In order to realize high spatial resolution, it is necessary to employ a detector having a relatively short integration time per spatial resolution element, so that no spatial information is lost in the detection process, but this degrades the temperature resolution. Attempts to increase band width of arrays by the use of special phase shifters and to gain integration time by the use of multiple beam forming networks have been found to cause lower transducer efficiency, with no net overall increase in sensitivity.

SUMMARY OF THE INVENTION

In accordance with the present invention, a radiometer on an aircraft or orbiting spacecraft has improved spatial and temperature resolutions for electromagnetic energy from terrestrial sources, such as the ground and ocean, as well as for the atmosphere. The radiometer is capable of deriving accurate indications of ground conditions, such as soil moisture, crop type and conditions, etc., and the state of the ocean, such as wave structure and height, wind and sea-surface interface temperature, as well as various meteorological parameters, such as temperature profiles, water-vapor distribution and precipitation conditions.

The disadvantages of the prior art are overcome by utilizing an array of N elements or subapertures, each of which transduces the electromagnetic energy from the monitored region into an electric signal. The signals from all of the elements are simultaneously fed to a plurality of identical, parallel processing channels. Output signals from the several processing channels are combined together to form signals representative of the energy propagated from subregions of the monitored region to the array. If desired, the output signals of the several channels can be combined in different ways, for example, by utilizing a Butler matrix, to derive signals representative of a number of different beams.

The specifically described embodiment relates to transducing microwave electromagnetic energy into electric signals wherein the transducer elements are antennas. However, it is to be understood that the principles of the invention are equally applicable to higher frequency energy, such as millimeter waves, as well as optical energy.

Each of the channels is operated as a Dicke radiometer and thereby includes a variable gain device responsive to the signal transduced by the element or subaperture which feeds the particular channel. The gain of each channel is controlled as a function of the difference in its output amplitude while its input is periodically disconnected from its array element and is instead sequentially connected to each of two noise sources at known temperatures. The noise sources may be resistors operating at a predetermined temperature, electronic noise sources, an antenna pointed at a "cold" region such as the zenith, or any other devices from which black body radiation at a predetermined noise temperature is derived. The gain of the channel is controlled with a time constant which is much longer than the time required for the channel to be switched from the element to the noise sources and back to the element. By controlling the gain of each channel in this manner, the energy incident on the element associated with each channel is effectively compared with the energy of the noise sources so that an output signal of each of the channels at the beam-former input is a replica, during the intervals when the transducer is connected at the input of the channel, of the amplitude and phase of the radiation incident on the transducer of the channel; the replica is at an intermediate frequency.

To scan the array across different subregions, each channel includes a variable delay element to control the amount of phase shift introduced by the channel on the signal transduced by the element. When the signals from the different channels are combined, with differential delay, the effect is the same as physically pointing the antenna at different subregions of the region being monitored at that time.

It is, accordingly, an object of the present invention to provide a new and improved, high resolution and high sensitivity radiometer that is contained on an orbiting spacecraft or an aircraft.

Another object of the invention is to provide a new and improved Dicke radiometer mounted on an orbiting spacecraft or an aircraft, which radiometer derives information having high spatial and temperature resolutions indicative of radiation from terrestrial and atmospheric regions.

A further object of the invention is to provide a radiometer mounted on an orbiting spacecraft or an aircraft, which radiometer employs antenna elements or subapertures of relatively small size, whereby the radiometer has a relatively high efficiency, wide band width, and can operate with relatively long integration times.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 1 is an exaggerated, pictorial view of the environment of the radiometer of the present invention; and FIG. 2 is a block diagram of a preferred embodiment of the invention.

DETAILED DESCRIPTION OF THE PREFERRED EMBODIMENT

Reference is now made to FIG. 1 of the drawing wherein a spacecraft 11 is illustrated as orbiting about a portion of terrestrial sphere 12. Spacecraft 11 includes a array of electromagnetic to electric signal transducers 13 which convert electromagnetic radiation from terrestrial (land and water) regions of the earth, as well as from the atmosphere surrounding the earth or from space, into electric signals that are amplitude, phase and frequency replicas of the energy incident on the transducers, in a bandpass to which the transducers are responsive. In a preferred form, array 13 includes a multiplicity of microwave antenna elements 14 capable of transducing microwave energy over a relatively large band width into electric signals. Elements 14 may, for example, be horns, slots, helices or parabolas with dipoles mounted at their foci, or they may be themselves arrays (subarrays). Elements 14 are arranged in a predetermined order, such as in a linear array, as illustrated; the invention is not limited to linear arrays but is equally applicable to other array configurations, such as planar and conformal arrays. As spacecraft 11 orbits over a particular portion of terrestrial sphere 12, array 13 is pointed at a particular terrestrial region, or at a particular atmospheric region, enabling the reception of electromagnetic radiant energy which is propagated from the region to the elements of array 13. The radiometer (described infra) on spacecraft 11 responds to the radiant energy to derive suitable data regarding the radiation emitted from the region. If it is desired to scan the beam from array 13 to various line of sight portions of terrestrial sphere 12 or to various atmospheric or space regions, electronic scanning of the beam, as described infra, can be employed.

To obtain high spatial and temperature resolution information regarding the electromagnetic signals irradiating elements 14, the elements are connected to a plurality of identical Dicke radiometer channels, each of which derives an output that is a replica in amplitude and phase of the energy incident on its element. The output signals of channels 15 are combined to form a signal having an amplitude indicative of the intensity of the radiation derived from the region at which array 13 is pointed, or to form several or many such signals, each indicative of the intensity of the radiation received from a subregion of that region. The circuitry included on spacecraft 11 for deriving this information is illustrated in FIG. 2.

In FIG. 2, N different channels 15, each of which has identical circuitry, are included. The N channels illustrated in FIG. 2 are respectively indicated as 15-1, 15-2, . . . 15-N. Corresponding components of the different channels bear the same reference numerals, except for the designation of the channel number, which is indicated by a dash and the number of the channel. A description of only channel 15-1 is provided; it is to be understood that the remaining channels are substantially identical, except where otherwise noted.

Channel 15-1 includes an antenna element or subarray 14-1 that derives a noise-like signal indicative of the radiation from the portion of the terrestrial sphere at which the beam of array 13 is pointed. The output signal of antenna 14-1 is selectively coupled to the input of variable gain, microwave preamplifier 16-1 through switch 17-1. Preamplifier 16-1 has a center frequency determined by the frequency which it is desired from the array to monitor. Amplifier 16-1, as well as the remaining amplifiers of channel 15-1, must have low-noise properties because of the noisy nature of the signal transduced by antenna 14-1. If a microwave amplifier having the requisite noise properties is not available for the frequency band of interest, it is preferable to omit preamplifier 16-1.

The output signal of preamplifier 16-1 is coherently converted to an IF frequency by a heterodyning mechanism including local oscillator 18-1 and mixer 19-1. Mixer 19-1 responds to the output signals of preamplifier 16-1 and local oscillator 18-1 to derive a beat frequency that is coupled to variable gain, IF amplifier 20-1, having a center of frequency equal to the sum or difference between the center frequency of preamplifier 16-1 and the frequency of local oscillator 18-1.

The IF output of amplifier 20-1 is supplied to a variable delay element 22-1. The delay introduced by element 22-1 causes a time delay or phase shift between the output of element 22-1 relative to the timing or phase of the signals existing at the output of the delay elements 22-2, . . . , 22-N so that the boresight axis of the beam or beams of array 13 can be scanned over the terrestrial sphere 12, as well as to portions of the atmosphere or space and over subregions of the region from which radiant energy illuminates the antenna elements 14-1, . . ., 14-N. The delay introduced by each of elements 22-1, 22-2, . . . , 22-N is controlled by a programmer (not shown) in a conventional manner.

Because the IF frequency derived from amplifier 22-1 may not be optimal for operating delay elements 22-1, . . ., 22-N or for enabling them to be produced economically, the output frequency of amplifier 20-1 can be altered further by a heterodyning mechanism including mixer 23-1 and local oscillator 24-1. Mixer 23-1 includes an output filter (not shown) having a center frequency equal to the difference between the center frequency of amplifier 20-1 and the frequency of local oscillator 24-1 so that a second, coherent IF is derived from the output of mixer 23-1 and delay element 22-1. Delay element 22-1 may take any of several forms, such as a diode controlled delay line or a ferrite phase shifter.

It is an important feature of the invention that amplification, in the form of amplifiers 16-1, 20-1, can precede the delay devices in the signal path so that the noise added by the delay devices affects the temperature resolution of the radiometer much less than would be the case if they were used prior to amplification in the signal path. It is a further important feature that the operating frequency band of the delay elements 22-1, . . ., 22-N may differ from that of other parts of the system, and may differ, in particular, from the frequency band in which antennae 14-1, . . . , 14-N are responsive. It is a consequence of these features that delay devices may be utilized which would otherwise be unsuitable because they are noisy or do not have a correct frequency band so that performance may be optimized or cost decreased, or both, relative to the prior state of the art.

The output signals of delay elements 22-1, 22-2, . . . , 22-N are combined phase-coherently in beam former 25 which derives one or more signals that are replicas of the amplitude and phase for each frequency component of the radiant energy incident on all antennae 14-1, 14-2, . . . , 14-N from subregions of the region under observation and are replicas of the vector sums of the energy illuminating all of the elements subject to the phase shifts introduced in the delay elements 22 and the beam former. Beam former 25 combines the signals from the several channels in such a fashion as to yield the equivalent of one, or possibly several, antenna beam signals. If only a single beam is desired, the beam former can be a simple signal combining network, such as a corporate feed wherein the signals from the different channels are vector-summed together. Alternatively, if several simultaneous beams are desired, i.e., beams having differing lobe patterns, a Butler matrix or other multiport combining network is employed as beam former 25. In such an instance, beam former 25 includes a plurality of outputs on leads 26-1, 26-3, . . . , 26-M. If the output frequency of delay elements 22-1, 22-2, . . . , 22-N is incompatible with the properties of the beam former 25, the output frequency of the delay elements is coherently shifted to an appropriate frequency by a heterodyning structure including local oscillator 27 and mixer 28. It is an important feature of the invention that the operating frequency band of the beam former 25 may differ from that of other parts of the system, and in particular, may differ from the frequency band in which antennae 14 are responsive. It is a further important feature of the invention that amplification in the form of amplifiers 16 and 20 precedes the beam former in the signal channels so that the noise added by beam former 25 affects the temperature resolution of the radiometer much less than would be the case if the beam former were used prior to amplification in the signal path.

To enable accurate indications of the energy level of each of the beams to be derived, it is necessary for the signals supplied by each of the channels to beam former 25 to be an accurate replica, in amplitude, of the transduced energy. The relative time delay or phase shift in each of the channels must be controlled by delay elements 22, an object preferably achieved by providing identical local oscillators 18, 24 and 27 for each of the channels. To assure an accurate reproduction of the amplitude characteristics of the wave transduced by element 14-1, in propagating from the output of horn 14-1 to the input of beam former 25, the gains of amplifiers 20-1 and 16-1 are accurately controlled against reference values.

The reference values are established by deriving signals from electromagnetic noise radiators at known, predetermined noise temperatures. For channel 15-1, the radiators are shown in the form of resistors 31-1 and 32-1 which are maintained at accurate, predetermined controlled temperatures $T_1$ and $T_2$. Noise generated by resistors 31-1 and 32-1 is selectively coupled as an input signal to preamplifier 16-1 by Dicke switch 17-1. Generally, but not necessarily, Dicke switches 17-1, 17-2, . . . , 17-N are operated simultaneously so that channels 15-1, 15-2, . . . , 15-N are simultaneously responsive to the signals from resistors 31-1, 31-2, . . . 31-N and 32-1, 32-2, . . . , 32-N, respectively; it is, however, essential that the channels 15-1, 15-2, . . . , 15-N be simultaneously responsive to signals from elements 14-1, 14-2, . . . , 14-N while the beam indicating signals are derived on output leads 26-1, 26-2, . . . , 26-M.

With resistors 31-1 and 32-1 connected to the input of preamplifier 16-1, synchronous detector 33-1 is energized so that it is responsive to the output signal of mixer 28-1. Synchronous detector 33-1 derives a signal in response to the difference in level of the output signals of mixer 28-1 while resistors 31-1 and 32-1 are connected in circuit with the input of preamplifier 16-1. This may be accomplished in a direct comparison, or indirectly by intercomparing the three signal levels when transducer 14-1 and noise radiators 31-1, 31-2 are connected respectively to the input of preamplifier 16-1. Synchronous detector 31 includes conventional storage circuitry whereby the signal level derived at its output remains constant over time periods which are long relative to the switching cycle of Dicke switch 17-1. The output of synchronous detector 33-1 is applied as a gain control input signal to variable gain preamplifier 16-1 and variable gain IF amplifier 20-1. Thereby, the gains of amplifiers 16-1 and 20-1 remain stabilized while the amplifiers are responsive to the signal from antenna 14-1. Because of the gain stabilization of amplifiers 16-1 and 20-1, the output signal of mixer 28-1 is an accurate replica, except for the delay introduced by delay 22-1, of the phase and amplitude of the signal transduced by antenna 14-1.

To determine the amplitude of the energy in each of the beam indicating signals derived on leads 26-1, 26-2, . . . , 26-M, the signals on these leads are fed to parallel, identical processing networks 34-1, 34-2, . . . , 34-M with nomenclature arrangements similar to those of channels 15-1, 15-2, . . . , 15-N, whereby a description of network 34-1 suffices for the remaining networks.

Processing network 34-1 includes a relatively long integration time amplitude detector 35-1 which derives an output signal indicative of the energy level of the beam indicating signal on lead 26-1. Detector 35-1 is driven by a replica of the signal on lead 26-1, as fed through stabilized amplifier 36-1. Detector 35-1 is synchronized with Dicke switch 17-1 so that it is responsive to the difference in the coherently added signals during the time periods when antennae 14 are connected to preamplifiers 16 relative to incoherently added signals when noise sources 31 or 32 are connected to preamplifiers 16. In a preferred mode of operation, noise source 31-1 corresponds to a temperature near the brightness temperature of the region being monitored; in that case detector 35-1 senses the difference in amplitude on lead 26-1 when noise source 31-1 is connected to preamplifier 16-1 relative to when antenna 14-1 is connected, and the detector is disabled when noise source 32-1 is connected to the input of preamplifier 16-1. For many applications, amplifier 36-1 can be responsive directly to the signal on lead 26-1, but for certain applications, it is useful to shift the frequency of the signal on lead 26-1 prior to amplification, a result achieved by providing a heterodyning mechanism including local oscillator 37-1 and mixer 38-1. The signals derived from the detectors of the several output channels 34-1, 34-2, . . . , 34-M may be recorded directly, processed by a computer, or used in any suitable manner compatible with the overall design and purpose of the system. The output of the several detectors 35-1, 35-2, . . . , 35-M can, for example, serve as a modulation source for signals transmitted by spacecraft 11 back to receiving stations mounted on terrestrial sphere 12.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A radiometer for deriving high spatial resolution information from terrestrial, atmospheric or outer space regions, comprising an array of N elements for transducing electromagnetic energy into electric signals, all of said elements being simultaneously illuminated by electromagnetic energy from the region, N substantially identical, parallel processing channels, the ith one of said channels being provided for the ith one of said elements, where i is every integer from 1 to N, the ith channel including a variable gain device responsive to the signal transduced by the ith element and means for controlling the gain of the channel as a function of the channel output signal while at least one calibrated noise radiator is connected to the channel input, whereby the ith channel derives an output signal that is a replica of the amplitude and phase of radiation incident on the ith element, means for combining the output signals simultaneously derived from the N channels while each of the elements is simultaneously responsive to the radiation from the region so that the combining means derives a further signal that is a replica of the energy radiated from the region and a vector sum of the energy illuminating all of the elements from the region.

2. The radiometer of claim 1 wherein the ith channel includes variable delay means for controlling the amount of time delay introduced by the ith channel on the signal transduced by the ith element, whereby the beam is scanned over differing subregions of the region illuminating the transducers as the phase shift is varied.

3. The radiometer of claim 2 wherein the variable time delay is preceded by amplification means in the signal channel.

4. The radiometer of claim 3 wherein the operating frequency band of the variable time delay differs from that of the transducer elements.

5. The radiometer of claim 2 wherein the combining means is preceded by amplification means in the signal channel.

6. The radiometer of claim 2 wherein the combining means includes means for simultaneously deriving a plurality of signals that are respectively replicas of differing beams transduced by the array.

7. The radiometer of claim 3 wherein the means for controlling the gain of the ith channel includes calibrated noise generating means, means for selectively connecting the noise generating means and the ith element to an input of the ith channel at different times, detector means responsive to an output signal of the ith channel while the noise generating means is connected to the input for deriving a signal level indicative of the output level while the resistor means is connected to the input, and means responsive to the signal level for controlling the gain of the ith channel while the ith element is connected to the input of the ith channel.

8. The radiometer of claim 6 wherein the variable time delay is preceded by amplification means in the signal channel.

9. The radiometer of claim 8 wherein the operating frequency band of the variable time delay differs from that of the transducer elements.

10. The radiometer of claim 6 wherein the combining means is preceded by amplification means in the signal channel.

11. The radiometer of claim 10 wherein the operating frequency band of the combining means differs from that of the transducer elements.

12. The radiometer of claim 6 wherein the operating frequency band of the combining means differs from that of the transducer elements.

13. The radiometer of claim 2 wherein the means for controlling the gain of the ith channel includes calibrated noise generating means, means for selectively connecting the noise generating means and the ith element to an input of the ith channel at different times, detector means responsive to an output signal of the ith channel while the noise generating means is connected to the input for deriving a signal level indicative of the output level while the resistor means is connected to the input, and means responsive to the signal level for controlling the gain of the ith channel while the ith element is connected to the input of the ith channel.

14. The radiometer of claim 13 wherein the variable time delay is preceded by amplification means in the signal channel.

15. The radiometer of claim 14 wherein the operating frequency band of the variable time delay differs from that of the transducer elements.

16. The radiometer of claim 13 wherein the combining means is preceded by amplification means in the signal channel.

17. The radiometer of claim 1 wherein the combining means includes means for simultaneously deriving a plurality of signals that are respectively replicas of differing beams transduced by the array.

18. The radiometer of claim 17 wherein the combining means is preceded by amplification means in the signal channel.

19. The radiometer of claim 18 wherein the operating frequency band of the combining means differs from that of the transducer elements.

20. The radiometer of claim 19 wherein the operating frequency band of the combining means differs from that of the transducer elements.

21. The radiometer of claim 17 wherein the means for controlling the gain of the ith channel includes calibrated noise generating means, means for selectively connecting the noise generating means and the ith element to an input of the ith channel at different times, detector means responsive to an output signal of the ith channel while the noise generating means is connected to the input for deriving a signal level indicative of the output level while the resistor means is connected to the input, and means responsive to the signal level for controlling the gain of the ith channel while the ith element is connected to the input of the ith channel.

22. The radiometer of claim 21 wherein the combining means is preceded by amplification means in the signal channel.

23. The radiometer of claim 22 wherein the operating frequency band of the combining means differs from that of the transducer elements.

24. The radiometer of claim 21 wherein the operating frequency band of the combining means differs from that of the transducer elements.

25. The radiometer of claim 1 wherein the means for controlling the gain of the ith channel includes calibrated noise generating means, means for selectively connecting the noise generating means and the ith element to an input of the ith channel at different times, detector means responsive to an output signal of the ith channel while the noise generating means is connected to the input for deriving a control signal level indicative of the output level while the resistor means is connected to the input, and means responsive to the control signal level for controlling the gain of the ith channel while the ith element is connected to the input of the ith channel.

26. The radiometer of claim 25 wherein the noise generating means includes a pair of resistors maintained at different predetermined temperatures, and the selective connecting means includes means for connecting the resistors to the input at different times.

* * * * *